(12) United States Patent
Frisken

(10) Patent No.: US 6,757,097 B1
(45) Date of Patent: Jun. 29, 2004

(54) WAVELENGTH DEPENDENT ISOLATOR

(75) Inventor: Steven Frisken, Vaucluse (AU)

(73) Assignee: Bookham Technology PLC, Abingdon (GB)

( * ) Notice: Subject to any disclaimer, the term of this patent is extended or adjusted under 35 U.S.C. 154(b) by 0 days.

(21) Appl. No.: 10/129,828

(22) PCT Filed: Nov. 9, 2000

(86) PCT No.: PCT/AU00/01380

§ 371 (c)(1),
(2), (4) Date: Aug. 9, 2002

(87) PCT Pub. No.: WO01/37035

PCT Pub. Date: May 25, 2001

(30) Foreign Application Priority Data

Nov. 12, 1999 (AU) .............................. PQ4004

(51) Int. Cl.[7] .......................... H01S 3/00; G02F 1/295; G02B 27/28
(52) U.S. Cl. ............................ 359/337; 359/484; 385/6
(58) Field of Search .................... 359/337, 702, 359/281, 484; 385/6, 24

(56) References Cited

U.S. PATENT DOCUMENTS 6,088,153 A     7/2000  Anthon
6,330,117 B1 *  12/2001 Seo ............................. 359/702
6,480,331 B1 *  11/2002 Cao ............................. 359/484

FOREIGN PATENT DOCUMENTS

| EP | 0982620 A2 | 3/2000 |
|---|---|---|
| JP | 08-005976 | 1/1996 |
| JP | 6026521 | 1/1997 |
| JP | 2000137151 A | 5/2000 |

* cited by examiner

Primary Examiner—Mark Hellner
(74) Attorney, Agent, or Firm—Sughrue Mion, PLLC

(57) ABSTRACT

A wavelength dependent optical device comprising: at least two optical Ports (21, 22); a first series of polarisation modifying optical components (23, 25, 27, 28) placed between the two Ports and a first dielectric mirror (29); the first dielectric mirror (29) operating substantially in reflectance mode at a first predetermined wavelength range and substantially in transmission mode at a second predetermined wavelength range; at least one second polarisation modifying optical component (30) placed between the first dielectric mirror (29) and a second mirror (31); the second mirror (31) operating substantially in reflectance mode at the second predetermined wavelength range; wherein light emitted from the first Port (21) at the first predetermined wavelength range is transmitted to the second Port (22), and light emitted from the first Port (21) at the second predetermined wavelength range is transmitted away from the second Port (22).

26 Claims, 12 Drawing Sheets

WAVELENGTH DEPENDENT ISOLATOR

FIELD OF THE INVENTION

The present invention relates to the field of isolators and, in particular, to isolators that operate in a wavelength dependent manner. The present invention also relates to attenuators.

BACKGROUND OF THE INVENTION

In optical component systems, it is often necessary to amplify and mix optical signals. For example, one form of common amplification is to utilise a pump laser to amplify an Erbium doped fibre so as to cause an input transmission signal to be amplified to thereby form part of an output transmission signal.

Further, in amplification systems, unwanted feedback can also lead to undesirable effects. For example, a common pump amplification wavelength in the aforementioned Erbium doped fibre systems is approximately 1550 nanometres. An example wavelength for utilisation in transmission is approximately 1470 nanometres.

In any pumping system, it is desirable so as to isolate or attenuate the extent of any feedback of the pump wavelength into previous stages of the system and hence it is desirable to isolate the pump wavelength from other wavelengths which may comprise the normal operational parts of the system.

An example of a known form of wavelengths specific isolator is illustrated schematically in FIG. 1, wherein a pump laser 1 emits light at 1550 nanometres through an Erbium doped lasing section 2. A wavelength selective di-electric mirror 3 reflects wavelengths at 1550 nanometres along path 4 whilst acting in transmission at other wavelengths. The isolator 5 acts to isolate the emissions 4. Light input at the input end 6 is split by second di-electric mirror 7 which reflects light at 1550 nanometres along path 8. The light is able to pass through the isolator 5 which only isolates the return path. Wavelengths outside of 1550 nanometres pass through the dielectric mirror 7 along path 9 and through the second dielectric mirror 3 where they are again joined with the light at 1550 nanometres passing through isolator 5. They can be subsequently amplified by amplifier 2 before being output 10.

The arrangement of FIG. 1 has a number of draw backs. Firstly, it relies on a large number of components which is like to add expense to the overall system. Further, the use of the dielectric mirrors may be non ideal and hence lead to performance degradation.

Further, in optical signal processing applications, it is often desirable to attenuate a first range of frequencies in a controlled manner relative to a second range of frequencies. For example, Erbium doped fibres often exhibit frequency dependant amplification properties. The frequency dependency can also be variable with respect tot he optical power being input to the amplifier. If left unaccounted for, this can lead to undesirable effects in wavelength division multiplexed (WDM) systems. Therefore, it is generally desirable to be able to provide a frequency dependant amplitude attenuation of an optical signal.

SUMMARY OF THE INVENTION

It is an object of the present invention to provide an alternative form of wavelength dependent isolator having improved operational characteristics and a simplified form of construction.

In accordance with a first aspect of the present invention, there is provided a wavelength dependent optical device comprising: at least two optical Ports; a first series of optical components placed between the two Ports and a first dielectric mirror; a first dielectric mirror operating substantially in reflectance mode at a first predetermined wavelength range and substantially in transmission mode at a second predetermined wavelength range; at least one second optical component placed between the first dielectric mirror and a second mirror; a second mirror operating substantially in reflectance mode at the second predetermined wavelength range; wherein light emitted from a first Port at the first predetermined wavelength is transmitted to a second Port, and light emitted from the first Port at the second predetermined wavelength is transmitted away form the second Port.

Preferably, the device is also adapted such that light emitted from the second Port at the first predetermined wavelength can be transmitted to the first Port, and light emitted from the second Port at the first predetermined wavelength is transmitted away form the first Port.

The first series of optical components can comprise a first walk off plate; a first half wave plate; focussing means for focussing light emitted from the Ports; and a first non-reciprocal rotator. The second optical component can comprise a second non-reciprocal rotator.

In an alternative embodiment, the optical components can comprise a walk off plate; a series of reciprocal rotators rotating different Portions of polarised light in opposite directions; a first non-reciprocal rotator; a second walk off plate at a different orientation to the first walk off plate, a second reciprocal rotator; a third reciprocal rotator; and focussing means for focussing light emitted from the optical Ports.

Preferably, a first one of the predetermined wavelength ranges corresponds to the pump wavelength range of an optical fibre laser device and a second one of the predetermined wavelength ranges correspond to a signal transmission wavelength through an optical fibre communications system.

In accordance with a further aspect of the present invention, there is provided in a reflective isolator device, a method of providing a wavelength dependant isolator comprising the steps of: transmitting light emitted through a first Port through a series of polarisation modifying optical components; utilising a dielectric mirror to filter out a first wavelength range from other wavelength ranges of the transmitted light; manipulating the polarisation state of the first wavelength range; recombining the manipulated first wavelength with the other wavelength ranges of the transmitted light; transmitting the recombined light through a second series of polarisation modifying optical components towards a second Port; such that light emitted from the first Port in the other wavelength ranges is directed towards the second Port whereas light emitted from the first Port in the first wavelength range is transmitted away from the second Port.

Further, preferably light emitted from the second Port in the other wavelength ranges is directed towards the first Port whereas light emitted from the second Port in the first wavelength range is transmitted away from the first Port.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF THE PREFERRED AND OTHER EMBODIMENTS

In the preferred embodiment, a reflective isolator is provided which has wavelength dependent isolating capabilities. In the example embodiments, the isolator isolates a signal at a first predetermined wavelength while allowing other wavelengths to pass.

Figure 2:
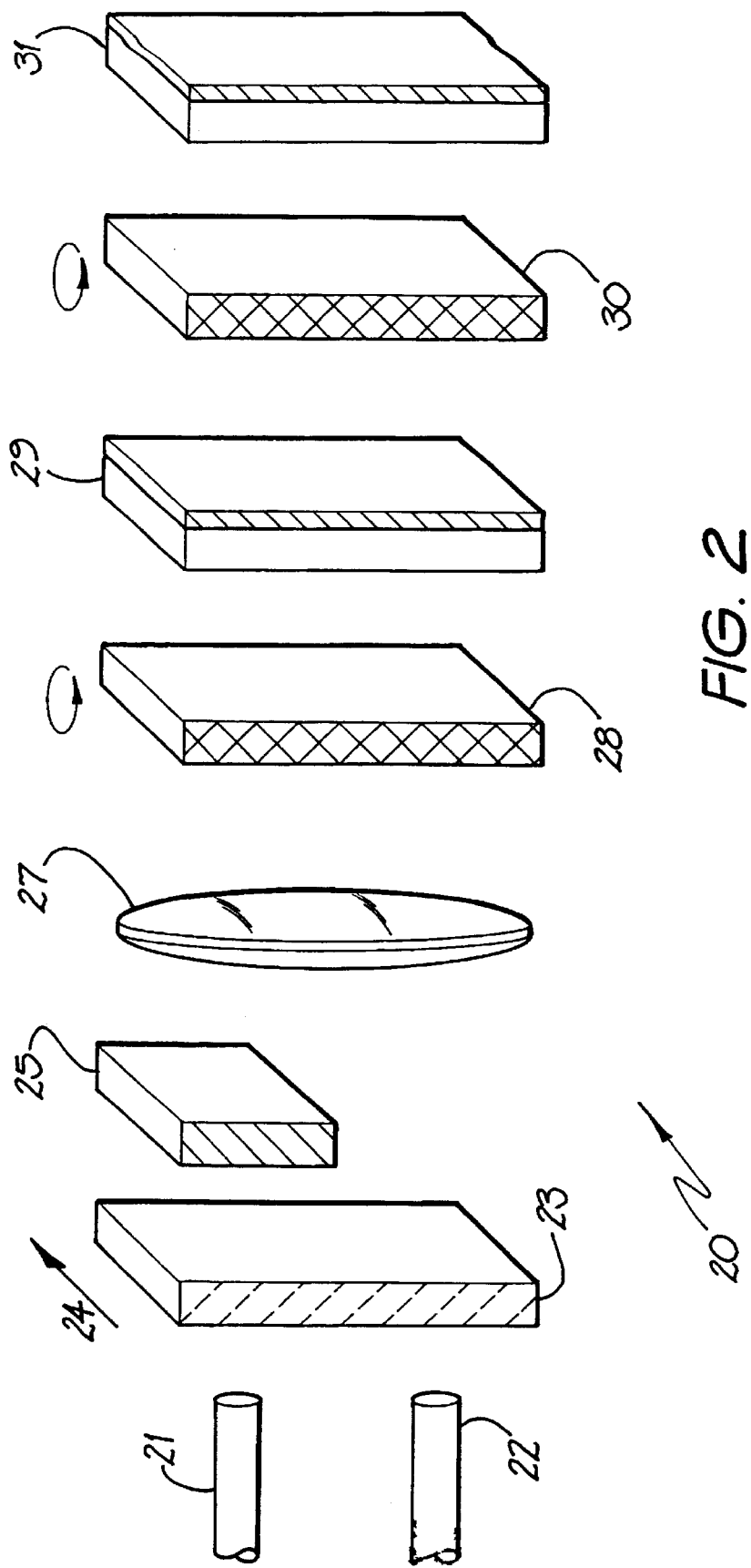
FIG. 2 illustrates schematically an arrangement of the first embodiment.

Turning initially to FIG. 2, there is illustrated schematically 20 the arrangement of the wavelength selective isolator of the preferred embodiment. Bi-directional input-output Ports Port 1(21) and Port 2(22) project and accept light from a first walkoff plate 23 with the walkoff alignment being in direction 24. The walkoff plate 23 acts to separate or combine polarisation states in accordance with requirements. A first reciprocal rotator or half wave plate 25 acts to rotate the polarisation state by 45 degrees in a reciprocal manner. The half wave plate can be oriented at 22.5 degrees to the ordinary axis of the proceeding rutile. A lens 27 acts to focus the light which may be diverging as it traverses the first embodiment. The Lens 27 can be repositioned at other positions amongst the other elements of the arrangement 20.

A non-reciprocal rotator 28 provides for non reciprocal rotation. The non-reciprocal rotator preferable provides for 22.5 degree rotation of the polarisation state and can be implemented by a Faraday rotator placed in a controllable external magnetic field. Next, a first dielectric mirror 29 is provided. The dielectric mirror is designed to be reflective at a wavelength at which it is desired to filter signals from the arrangement. For example, in the case of providing wavelength isolation or attenuation, the mirror should be reflective at the wavelengths that it is desired to attenuate (attenuation wavelength). In the present example, the dielectric mirror is substantially reflective at the signal wavelength (1550 nanometres) whilst being transmissive at pump wavelengths (assumed to be 1470 nanometres). Suitable dielectric mirrors are available from many suppliers including Optical Coatings of Japan. Alternatively, optical interference filters suitable for use are available from Barr Associates of 2 Lyberty Way, Westfield Mass., USA.

The light transmitted through dielectric mirror 29 passes through a second 45 degree Faraday Rotator 30 before being reflected at mirror 31. Depending on requirements, the Faraday Rotator 30 can be substituted with a quarter wave plate.

Figure 1:
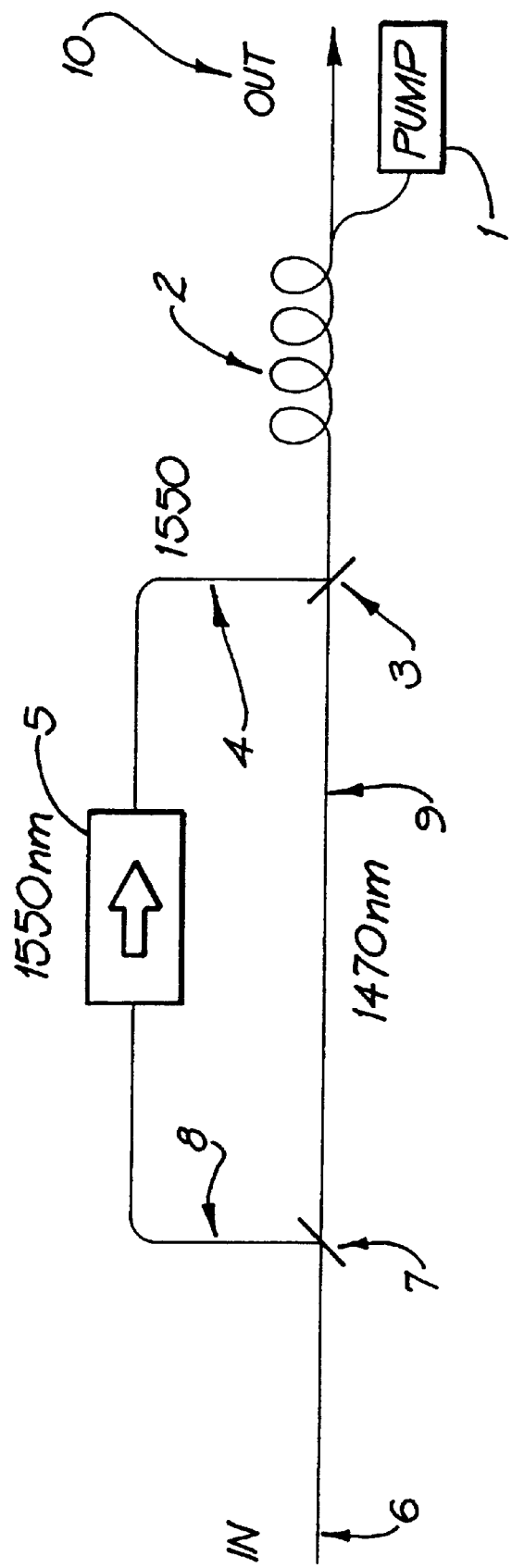
FIG. 1 illustrates an isolator design utilised in the prior art.
Figure 3:
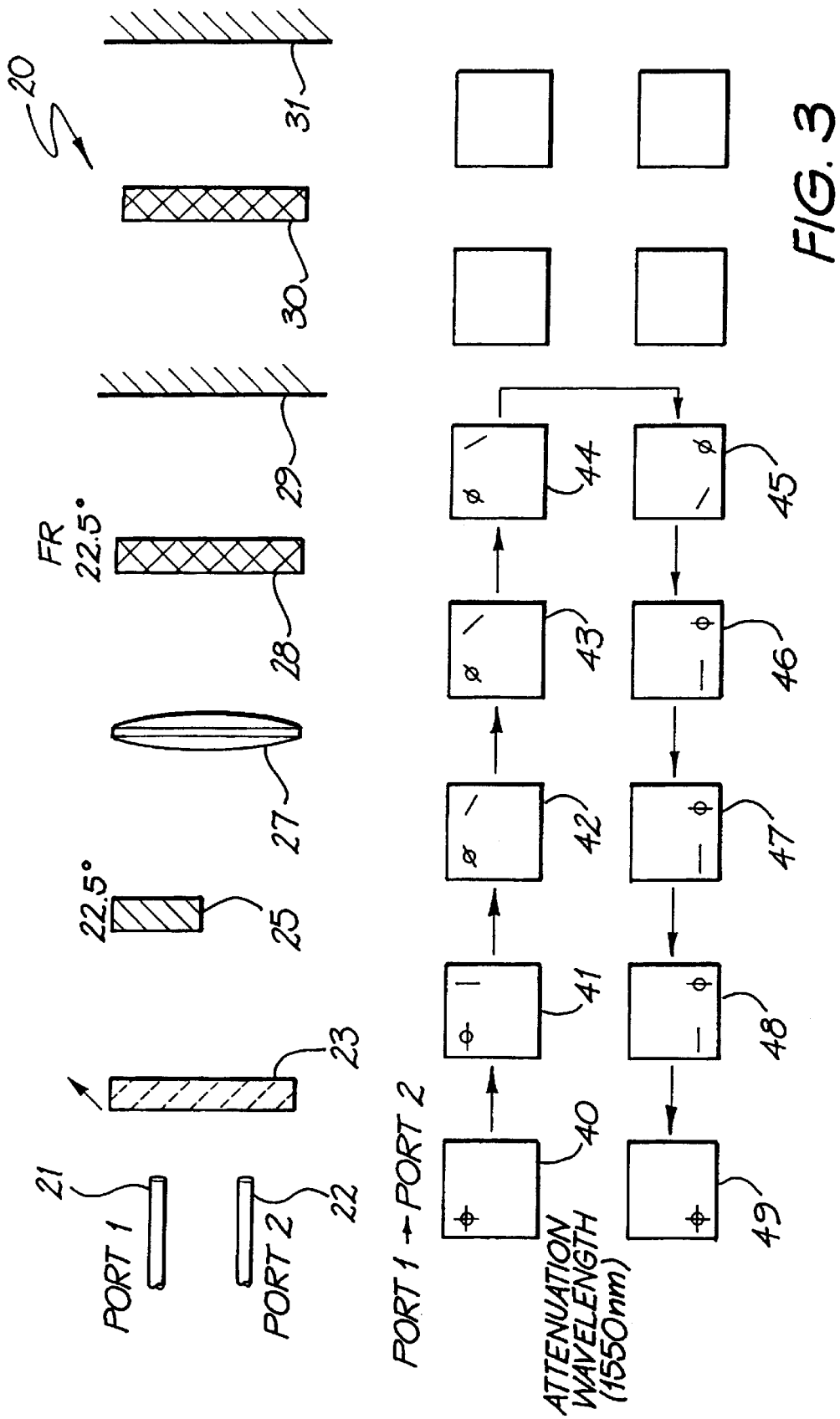
FIG. 3 to FIG. 6 illustrates various polarisation state transitions for the arrangement of FIG. 1.

Turning now to FIG. 3, there is illustrated an initial series of polarisation state diagrams corresponding to FIG. 1 for the attenuation wavelength (1550 nanometres) pump wavelength travelling from Port 1(21) to Port 2(22). Initially, in a first diagram 40 the two polarisation states are spatially coincident as they exit Port 1. The walk off plate 23 results in a translation of one polarisation state relative to the other 41. The half wave plate 25 rotates each of the polarisation states by 45 degrees 42. The lens 27 acts to focus the polarisation states and has minimal effect 43 on their orientation. The Faraday rotator 28 further rotates the polarisation state by 22.5 degrees 44. The mirror 29 reflects the polarisation states so as to produce polarisation states 45. The Faraday rotator 28 then further rotates the polarisation state in a non-reciprocal manner to the first rotation resulting in the polarisation state 46. The lens 27 has no effect on the polarisation state 47 and the half wave plate 25 is positioned so that it has no effect on the polarisation state 48. Finally, the walk off plate 23 acts to align the polarisation states 49 for output to Port 2(22). Hence, the overall net effect at 1550 nanometres is to transmit the light from Port 1 to Port 2 in a polarisation independent manner.

Figure 4:
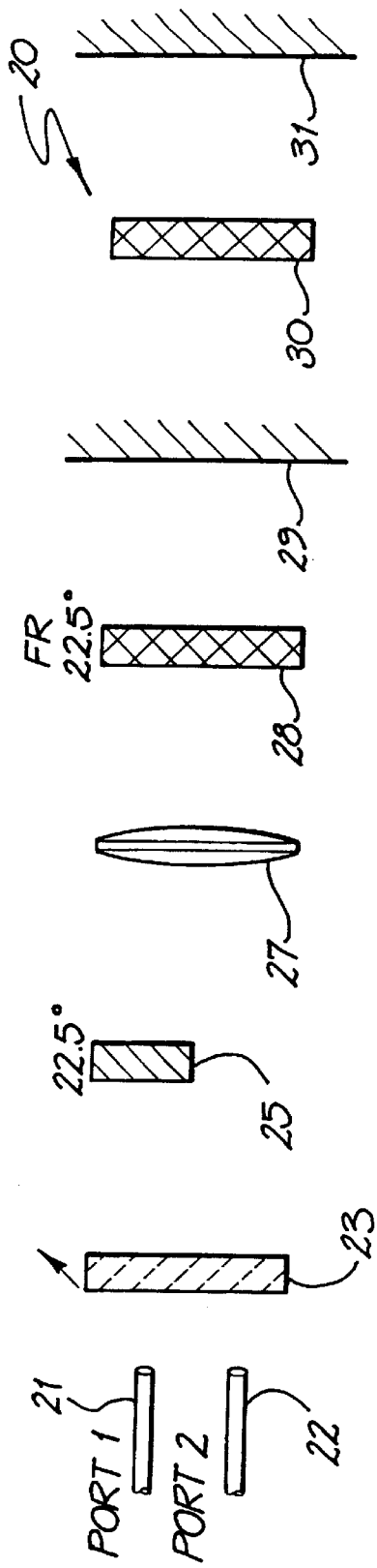
Figure 4:
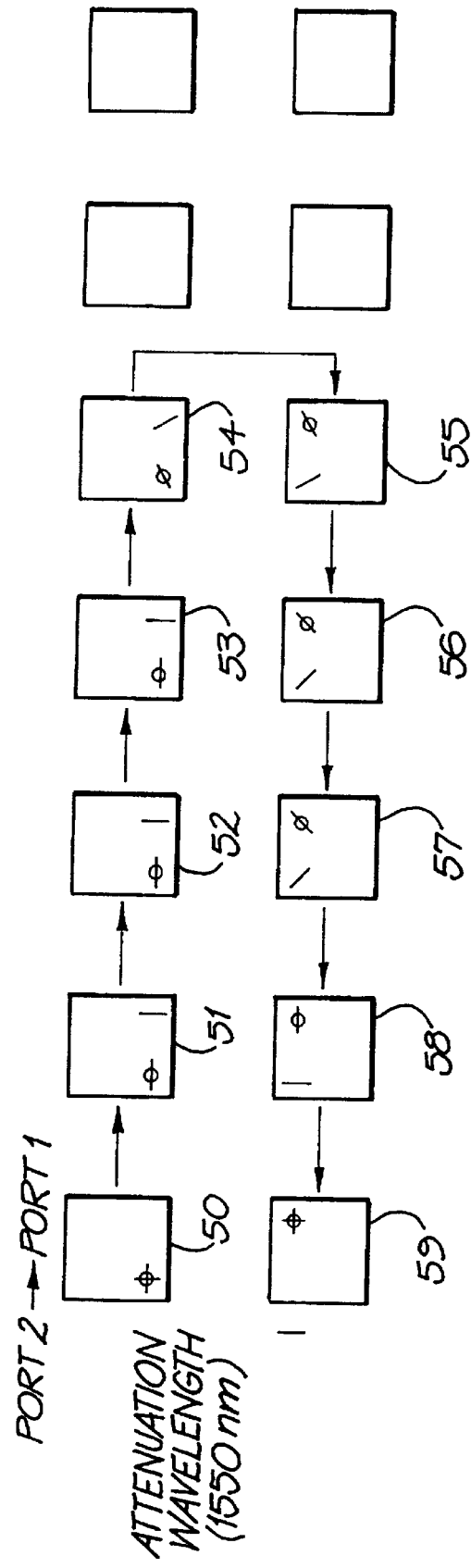

Turning now to FIG. 4, there is illustrated the process of transmission of light from Port 2(22) at the attenuation wavelength (1550 nanometres). Initially, the polarisation states 50 are spatially coincident as they exit Port 2(22). The walk off plate 23 acts to separate the polarisation states 51. The quarter wave plate 25 has no effect 52 on the polarisation states and nor does the lens 27 as illustrated by the polarisation state 53. The Faraday rotator 28 results in a rotation of the polarisation state 54. The mirror 29 reflects the polarisation states 55 which are then rotated in a non reciprocal manner by Faraday rotator 28 which applies a 22.5 degree rotation. The lens 27 has no effect 57 on the polarisation state. The half wave plate 25 further rotates the polarisation plate 58. Finally, the walk off plate 23 further separates the polarisation states 59 none of which is transmitted to the output Port. Hence, light travelling from Port 2 is projected away from Port 1(21). By comparing the transition diagrams of FIG. 3 and FIG. 4 it can be seen that at the attenuation wavelength, the system 20 acts as an isolator in that light is able to travel from Port 1 to Port 2 (FIG. 3) but is attenuated when it travels from Port 2 to Port 1.

Figure 5:
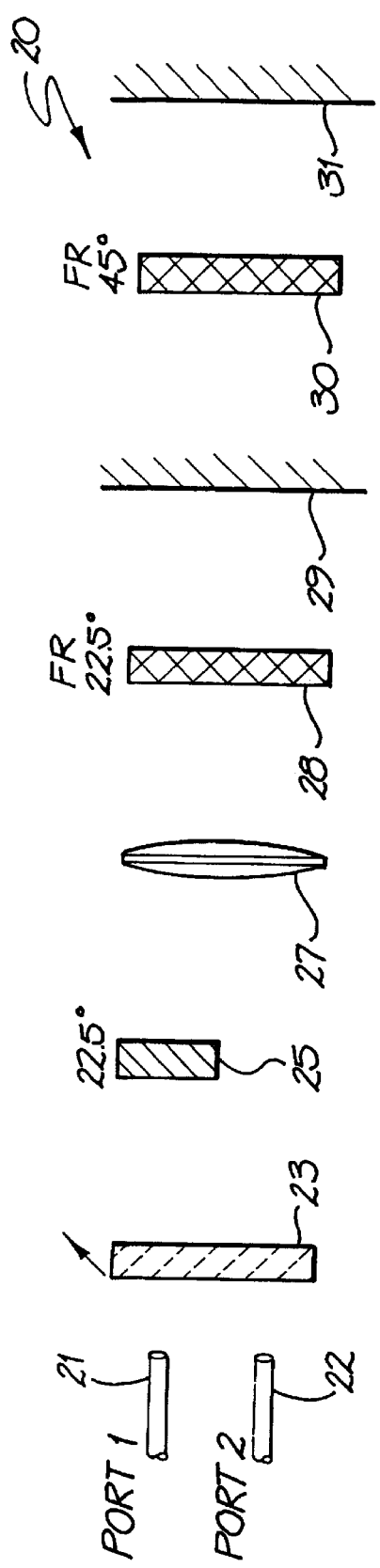
Figure 5:
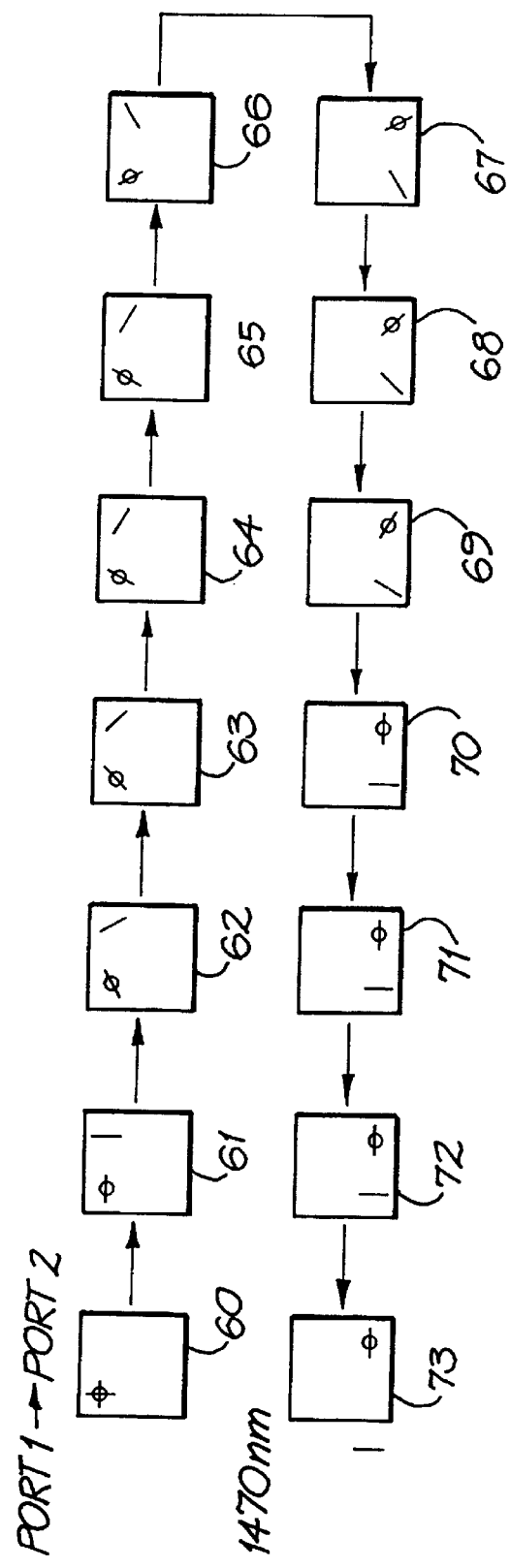
Figure 6:
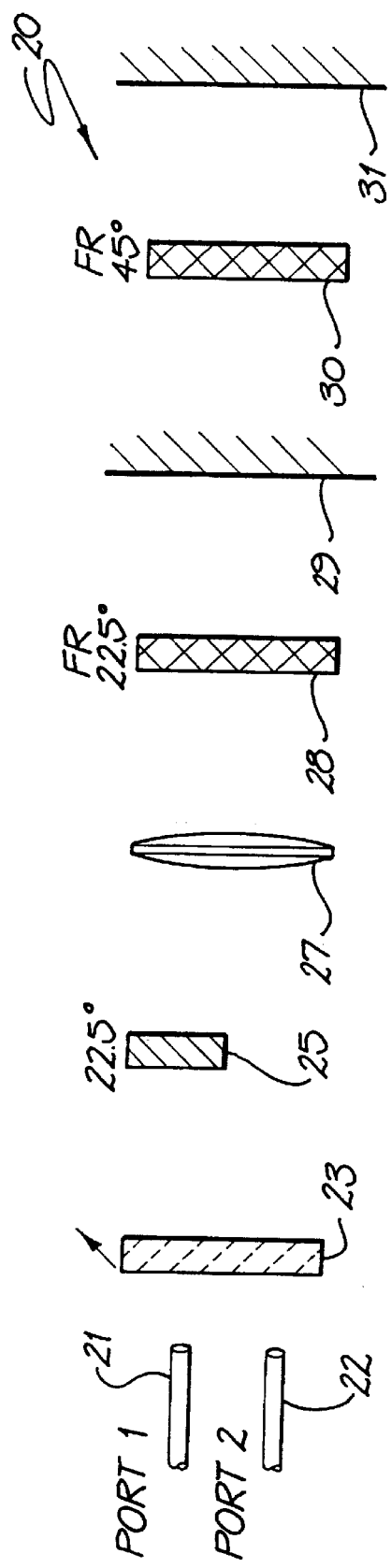
Figure 6:
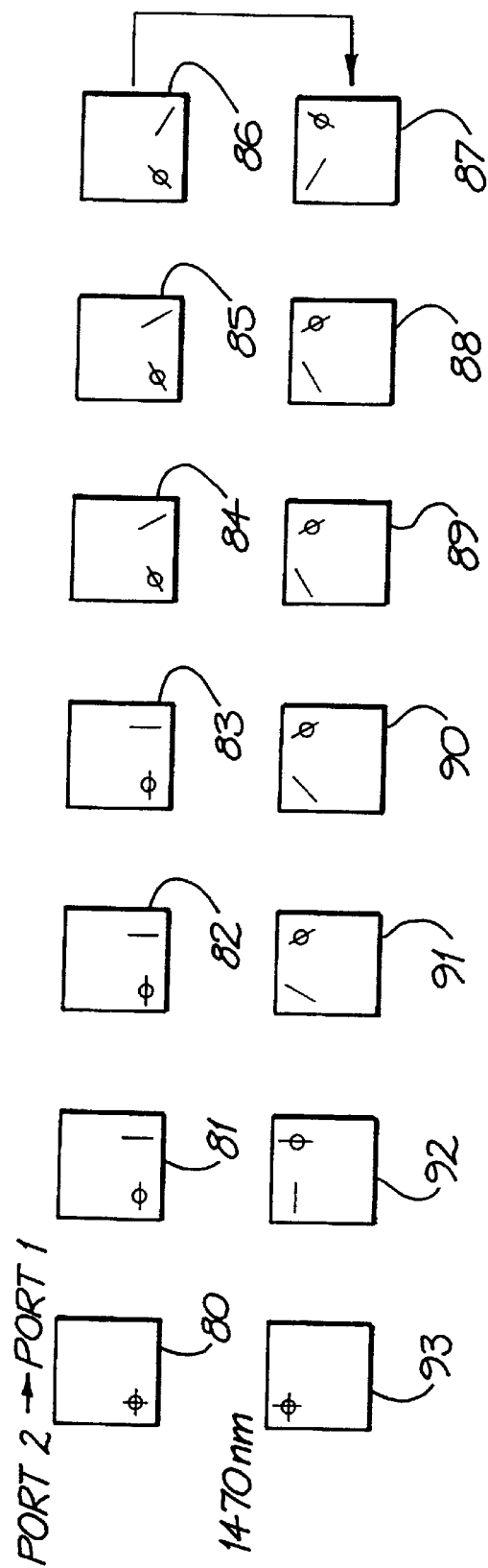

Turning now to FIG. 5 and FIG. 6, the polarisation states transitions will now be described for the case where light is to be transmitted to (1470 nanometres) nanometre case. Taking initially the case of transmission from Port 1(21), the polarisation states are initially spatially coincident 60 upon emission from Port 1(21). After passing through walk off plate 23, the polarisation states are separated 61. The half-wave plate 25 applies a 45 degree rotation of the polarisation state 62. The lens 27 does not effect the polarisation state 63. The Faraday rotator 28 applies a non-reciprocal rotation of 22.5 degrees to the polarisation state 64. The mirror 29, which is a dielectric mirror, is transparent at the transmission wavelength (1470 nanometres) and so the light passes through substantially unaffected 65. A second Faraday rotator 30 is placed behind the mirror 29. The Faraday rotator 30 provides a 45 degree rotation of the rotation states 66. In other embodiments, the Faraday rotator 30 could be replaced by an appropriately oriented quarter wave plate. The mirror 31 reflects the polarisation state 67. The Faraday rotator 30 then applies a non-reciprocal 45 degree rotation to the polarisation state so as to produce polarisation state 68. The mirror 29 has no effect on the polarisation state 69. The Faraday rotator 28 applies a further 22.5 degree rotation of the polarisation states. The lens 27 has no effect on the polarisation state and the reciprocal rotator 25 does not effect the polarisation states as light does not pass through the element 25. Subsequently, the walk off plate 23 translates one of the polarisation states relative to the other as indicated 73. Hence, as a result of the polarisation state transitions of FIG. 5, light at 1470 nanometres projected from the Port 1(21) is transmitted away from the Port 2(22) and the device acts as an isolator or attenuator at this wavelength.

Turning now to FIG. 6, there will be illustrated the polarisation state transitions for light projected from Port 2(22) to Port 1(21). Initially, the polarisation states are spatially coincident 80. The walk off plate 23 acts to separate the polarisation states 81. The separated light is unaffected at 82 by the reciprocal rotator 25 as the light has been emitted from Port 2(22) and bypasses the rotator. The mirror 27 does not effect the polarisation state 83. The Faraday rotator 27 rotates the polarisation states by 22.5 degrees 84. The mirror 29 does not effect the polarisation states 85. The Faraday rotator 30 further rotates the polarisation state by 45 degrees 86. The mirror 31 reflects the polarisation states 87. The Faraday rotator 30 then applies a 45 degree rotation 88. The mirror 29 has no effect on the polarisation state 89. The Faraday rotator 28 applies a 22.5 degree rotation of the polarisation states 90. The lens 27 has no effect on the polarisation state 91. The reciprocal rotating element 25 applies a 45 degree of the rotation polarisation state 92. The walk off plate 23 combines the polarisation states 93 for output to Port 1(21). It can therefore be seen that the net effect of the polarisation state transitions in FIG. 6 is to provide transmission in a polarisation independent manner for light at the transmission wavelength (1470 nanometres) projected from Port 2(22) to Port 1(21) whilst attenuating light at the transmission wavelength when transmitted from part 1 to part 2.

Through comparing FIG. 5 and FIG. 6 with FIG. 3 and FIG. 4, it can be seen that the opposite effects are provided depending upon the wavelength of the input light. Hence, the arrangement can act as a wavelength selective isolator or attenuator depending upon the transmission characteristics of the mirror 29 and depending on which parts act as the input and output parts. Further use of a quarter wave plate rather than a Faraday Rotator makes the arrangement an isolator or attenuator at one wavelength and transmissive in both directions at the second wavelength.

Further, it will be evident to those skilled in the art that the attenuation of the isolator or attenuator will be dependant upon the attenuation characteristics of the mirror 29. Of course, no mirror provides perfect attenuation and nor are the wavelength bounds of transmission perfectly defined. Invariably, the attenuation characteristics will take on a Gaussian type profile around a central wavelength of maximum transmission. Further, varying wavelength selective mirrors from different manufactures will provide differing qualities of transmission. In effect, the utilisation of the mirror results in a wavelength selective attenuation characteristic in accordance with the transmission characteristic of the mirror.

Further, mechanically variable wavelength selective mirrors can be utilised so as to provide a tunable attenuation characteristics. For example Etalon and Cavity Length variable or multi-layer dielectric filters using sliding tuning such as those available from Santac Corporation of Japan under the product code OFT-20M/30M could be utilised.

The principle of utilising a dielectric mirror so as to provide a predetermined wavelength isolator or attenuator can be extended to other arrangements. For example, in FIG. 7 there is illustrated schematically an alternative series of components which also achieve the wavelength dependant isolation or attenuation properties as aforementioned. Indeed, the arrangement may achieve higher levels of isolation as it has a dual stage isolation operation. In the arrangement of 100 of FIG. 7 two fibres, 101, 102 are provided having bi-directional input/output Ports including Port 1(101) and Port 2(102). A first walk off plate 103 walks off one of the polarisation states relative to the other in a direction perpendicular to the plane of the two Ports, 101, 102. Opposed reciprocal half wave plates 104, 105 provide for a 45 degree rotation of the polarisation states but in an opposite direction. A Faraday rotator 107 provides for a 45 degree non-reciprocal rotation of the polarisation state. The walk off plate 108 translates one of the polarisation states relative to the other in the direction tangential to the plane of the two Ports 101, 102. A subsequent half wave plate 109 is located so as to rotate the polarisation state of the upper half of the light travelling through the device 100. A second half wave plate 110 further rotates the polarisation state in a reciprocal manner for the upper quarter portion of the light travelling through the device 100. A lens 112 focuses the light travelling through the device. The lens can again be placed at different positions depending on requirements. A first dielectric mirror 113 is designed to be reflective at the transmission signal wavelength (for example 1470 nanometre) and to be otherwise transmissive at the attenuation wavelength (or pump) wavelength (for example, 1550 nanometres). A Faraday rotator 114 rotates the polarisation state by 45 degrees in a non-reciprocal manner. A final mirror 115 reflects the pump signal.

Figure 8:
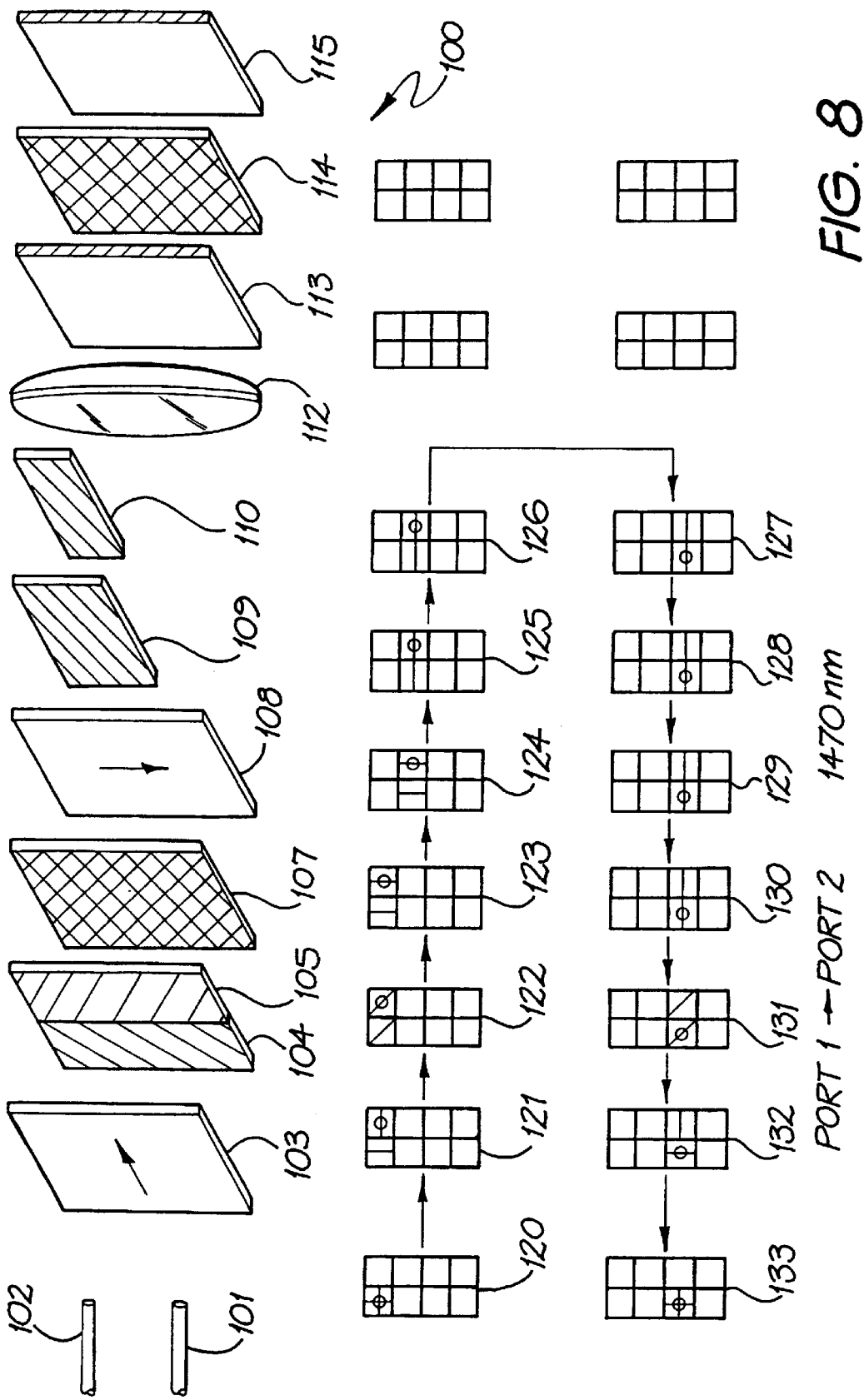
FIG. 8 to FIG. 11 illustrates various polarisation state transitions associated with the second embodiment.

Turning now to FIG. 8 to FIG. 11 there will now be explained the polarisation state diagrams for light traversing the arrangement 100. In a first series of diagrams as illustrated in FIG. 8, light emitted at the transmission wavelength (1470 nanometres) from the Port 102 is transmitted to the Port 101. Initially the two polarisation states are spatially aligned 120. The walkoff plate 103 results in a separation 121 of the polarisation states. Each half wave plate 104, 105 rotates the polarisation states in a opposite manner so that they are aligned but spatially distinct 122. The Faraday rotator 107 rotates the polarisation states 123. The walk off plate 108 translates one polarisation states relative to the other 124. The half wave plate 109 rotates the polarisation states 125. The light does not pass through the optical element 110 and hence remains unchanged 126. The lens 112 does not effect the polarisation state and the mirror 113 reflects the polarisation state so as to provide the resulting polarisation state 127. The optical elements 112, 109 do not effect the polarisation states as shown 128, 129. As the polarisation states are aligned perpendicular to the direction of the walk off plate 108, this plate does not effect the polarisation state 130. The Faraday rotator 107 rotates the polarisation states 131 in a non-reciprocal manner to the earlier rotation. The reciprocal rotators, 104, 105 in turn rotate the polarisation state 132. Finally, the walkoff plate 103 results in a combining of the polarisation states 133 at the output Port 101. Hence, the light is transmitted from Port 101 to Port 101 in a polarisation independent manner.

Figure 9:
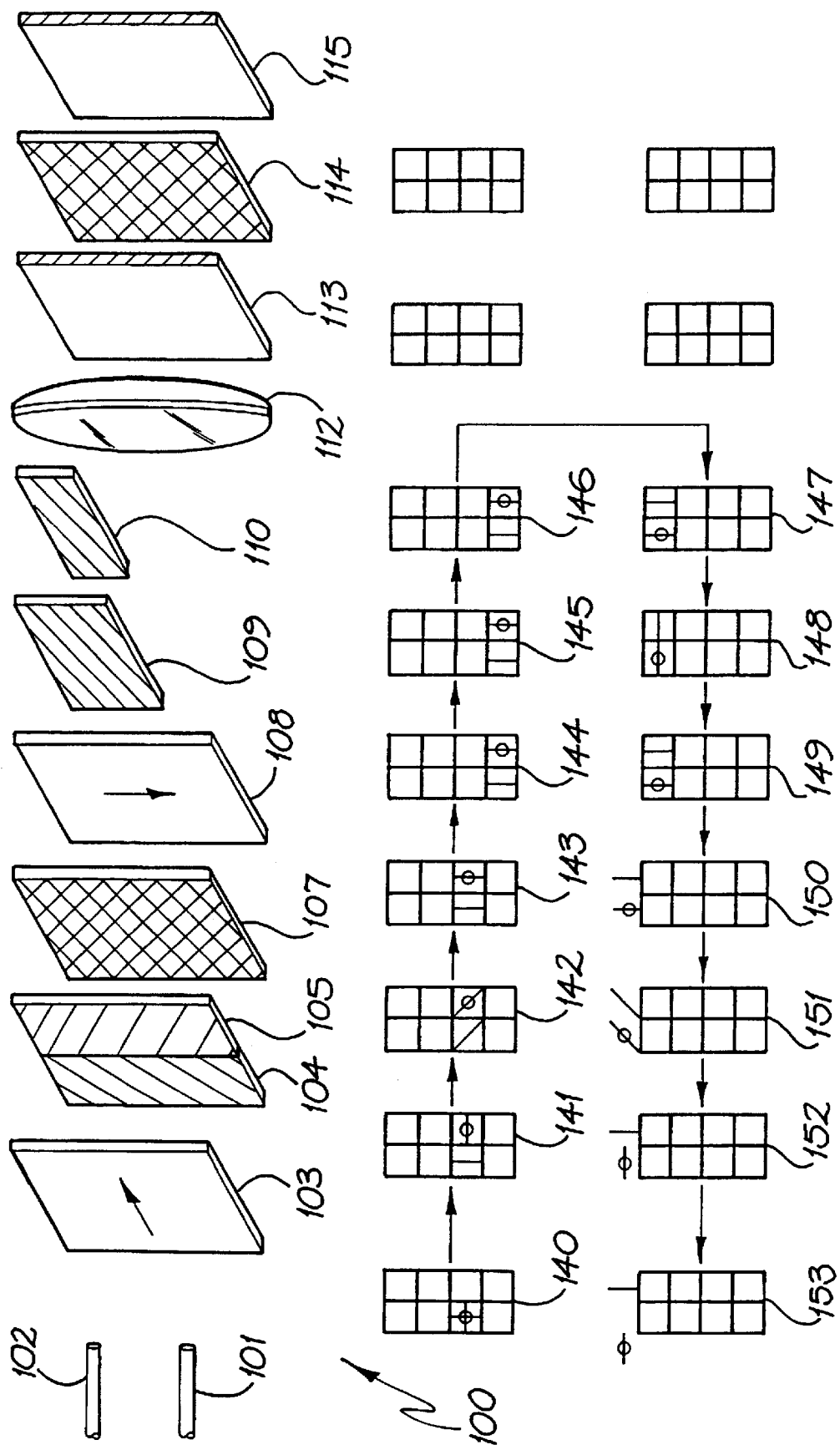

Turning now to FIG. 9, there is illustrated the polarisation state diagram for light at the transmission wavelength (1470 nanometres) being transmitted from Port 101. Initially, the polarisation states are spatially coincident 140. The walkoff plate 103 separates the polarisation states 141. The two half wave plates 104, 105 align the two polarisation states 142. The Faraday rotator 107 then rotates the polarisation states 143. This is followed by a translation of the polarisation states 144 by the walk off plate 108. The components 109 and 110 have no effect on the polarisation state 145, 146. The mirror 113 reflects the polarisation states 147. The reciprocal half wave plate 110 rotates the polarisation state 148 as does the half wave plate 109, providing the resulting polarisation state 149. The walk off plate 108 translates the polarisation state 150. The Faraday rotator 107 rotates the polarisation states 116. The half wave plates 104, 105 in turn also translate the polarisation states 152. The walk off plate 103 further separates the polarisation states 153. The net effect is that transmissions from Port 101 are directed away from Port 102 and hence the device acts as an isolator in this direction at the transmission wavelength (1470 nanometres) for light from part 102 to part 101.

Figure 10:
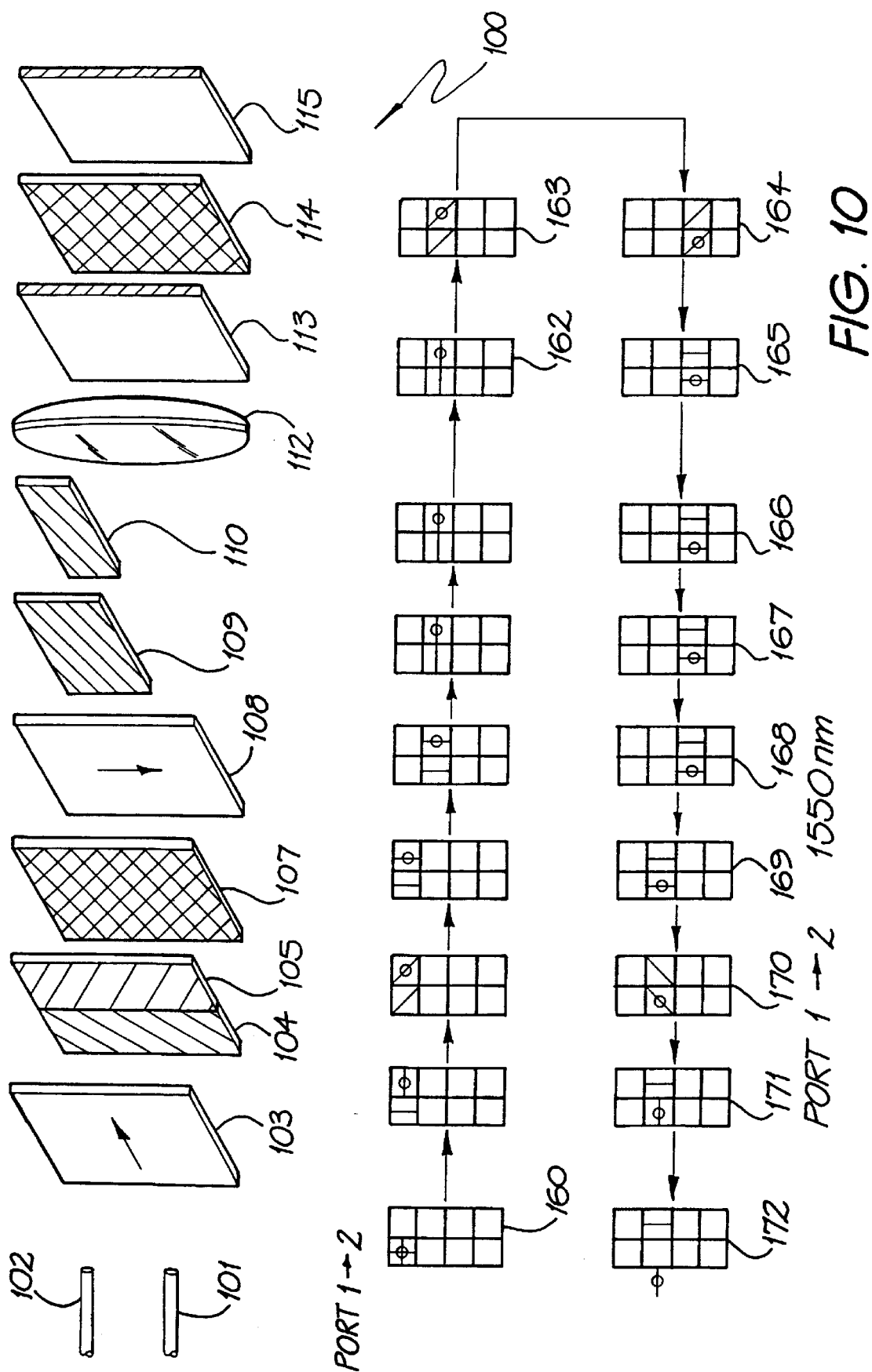

Turning now to FIG. 10, there is illustrated the polarisation state diagrams for the operation of the device for light emitted from Port 1 at the attenuation wavelength (550 nanometres). The emitted light 160 is acted on in the same manner up to the point 162 as that previously discussed with reference to FIG. 8. However, at the attenuation wavelength (1550 nanometres) the light traverses the mirror 113. It is subsequently rotated 163 by Faraday rotator 115 before being reflected 164 by mirror 115. Next the polarisation states are rotated 165 by Faraday rotator 114. The elements 113, 112, 110 and 109 have no effect on the polarisation state as shown 166, 167 and 168. The walk off plate 169 translates the polarisation states 169. The rotator 107 rotates the polarisation state 170. The two reciprocal rotators 104, 105 then independently rotate the polarisation states 171 before the walk off plate 103 displaces one polarisation relative to the other 172. The net effect being that the device 100 acts as an isolator or attenuator in transmission of light from Port 1 to Port 2 at the attenuation wavelength (1550 nanometres).

Figure 11:
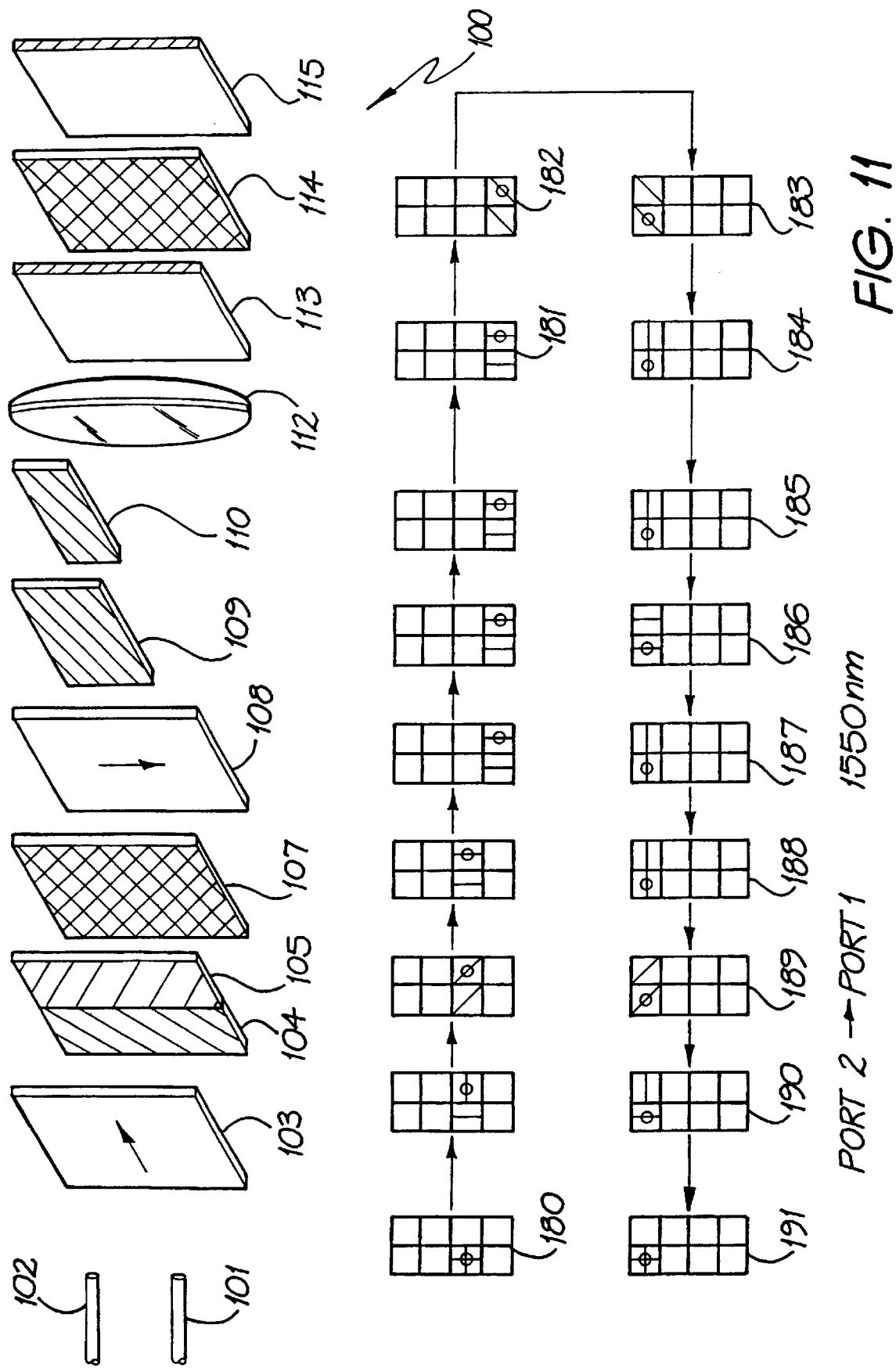

Turning now to FIG. 11, there is illustrated the polarisation state diagrams for the operation of the device for light emitted from Port 102 at the attenuation wavelength (1550 nanometres). The emitted light 180 is acted on in the same manner up to the point 181 as that previously discussed with reference to FIG. 9. Subsequently, the polarisation states are rotated 182 by Faraday rotator 114. The mirror 115 then reflects the polarisation states 183 before they are again rotated by rotator 114. The mirror 113 and lens 112 have no effect on the polarisation state 185. The quarter wave plate 110 rotates the polarisation states 186. The half wave plate 109 further rotates the polarisation states to produce states 187. As the polarisation states are aligned with the ordinary axis of the walk off plate 108, the walkoff plate has no effect on the polarisation state 188. Next, Faraday rotator 107 rotates the polarisation state 189. The two half wave plates 104, 105 rotate the polarisation states 190. Finally, the walk off plate 103 combines the polarisation states 191. The net result as shown in FIG. 10 is that the arrangement 100 transmits the light from Port 102 to Port 101 at the attenuation wavelength (1550 nanometres) in a polarisation independent manner.

It will therefore be evident that the arrangement 100 acts in an opposite manner depending upon the wavelength. Hence, the arrangements acts as a wavelengths dependent isolator or attenuator in a similar manner to the first embodiment.

Figure 7:
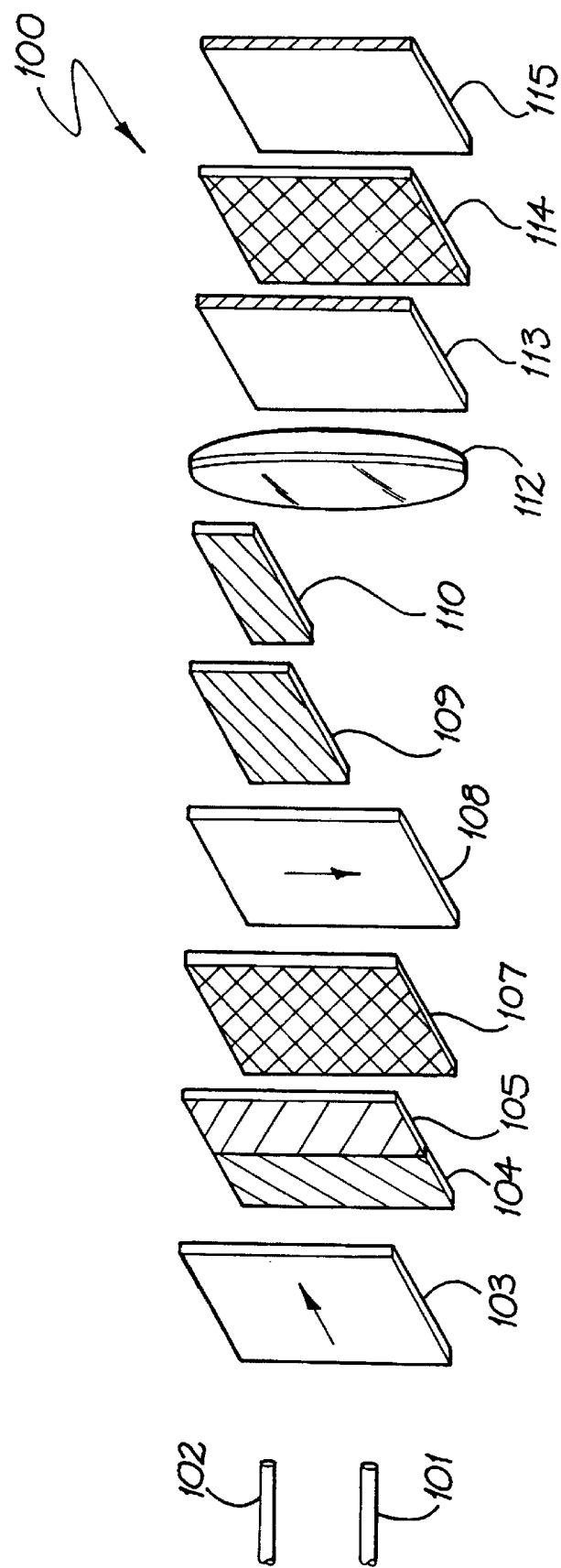
FIG. 7 illustrates schematically a second embodiment.

Further, by variation of the degree of faraday rotation of the Faraday Rotator 30 of FIG. 1 or 114 of FIG. 7, the degree of isolation or attenuation can be controlled. Normally, the degree of Faraday rotation is proportional to an external magnetic field. Hence, through variation of the magnetic field, the degree of separation of the polarisation states 73 of FIG. 5 and 172 of FIG. 10 can also be externally controlled, thereby providing control over the degree of isolation or attenuation of the device at the attenuation wavelength.

Figure 12:
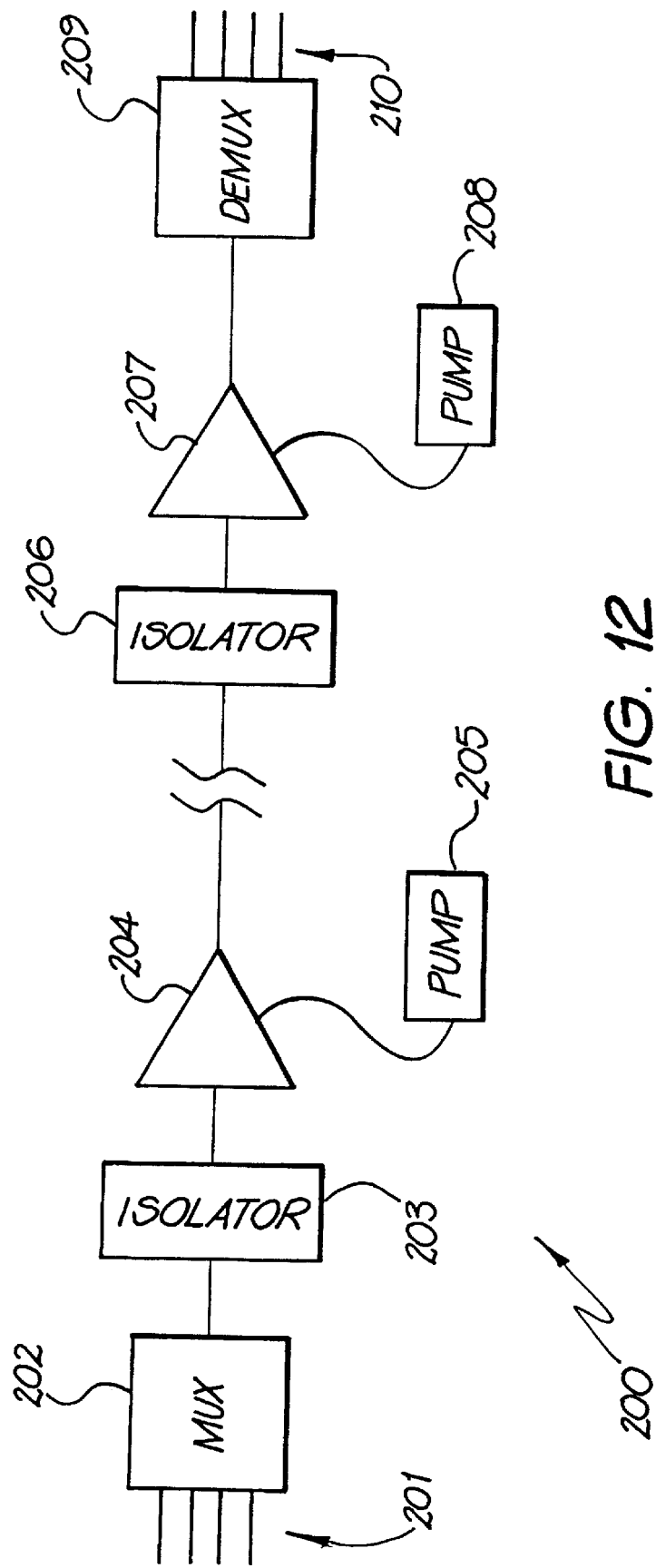
FIG. 12 illustrates schematically an optical communications system utilising the preferred embodiments.

The preferred embodiments can be utilised in many different optical communication systems. For example, in FIG. 12, there is illustrated one such communications system 200. A series of optical channels 201 are multiplexed together 202 for transmission. The channels are then passed through a first isolator and amplifier pair 203, 204. The amplifier being pumped at a pump wavelength by pump 205. The isolator 203 operating in accordance with the afore-mentioned embodiments. The amplified output is then transmitted to an optional series of isolator/amplifier pairs e.g. 206–208, before being demultiplexed 209 and output 210.

It would be appreciated by a person skilled in the art that numerous variations and/or modifications may be made to the present invention as shown in the specific embodiment without departing from the spirit or scope of the invention as broadly described. The present embodiment is, therefore, to be considered in all respects to be illustrative and not restrictive.

What is claim is:

1. A wavelength dependent optical device comprising:
    at least two optical Ports;
    a first series of optical components placed between said two Ports and a first dielectric mirror;
    a first dielectric mirror operating substantially in reflectance mode in at least a first predetermined wavelength range and substantially in transmission mode in at least a second predetermined wavelength range;
    at least one second optical component placed in the optical path between said first dielectric mirror and a second mirror;
    a second mirror operating substantially in reflectance mode at said second predetermined wavelength range; wherein
    light emitted from a first said Port at said first predetermined wavelength is transmitted to a second said Port, and light emitted from a first said Port at said second predetermined wavelength is transmitted away from said second Port, and
    wherein light emitted from said second Port at said first predetermined wavelength is transmitted away from said first Port, and light emitted from said second Port at said second predetermined wavelength is transmitted to said first Port.

2. A device as claimed in claim 1 wherein said first series of optical components include:
    a first walk off plate;
    a first half wave plate;
    focussing means for focussing light emitted from said Ports;
    a first non-reciprocal rotator.

3. A device as claimed in claim 1 wherein said second optical component comprises a second non-reciprocal rotator.

4. A device as claimed in claim 1 wherein said first series of optical components comprise:
    a walk off plate;
    a series of reciprocal rotators rotating different portions of polarised light in opposite directions;
    a first non-reciprocal rotator;
    a second walk off plate at a different orientation to said first walk off plate,
    a second reciprocal rotator;
    a third reciprocal rotator; and
    focussing means for focussing light emitted from said optical Ports.

5. A device as claimed in claim 1 wherein a first one of said predetermined wavelength ranges corresponds to the pump wavelength range of an optical fibre laser device and a second one of said predetermined wavelength ranges correspond to a signal transmission wavelength through an optical fibre communications system.

6. A device as claimed in claim 1 wherein light at said second predetermined wavelength which is transmitted away from said second Port is transmitted on either side of the central axis of said second Port.

7. In an optical device, a method of providing a wavelength dependant isolator comprising the steps of:
  transmitting light emitted through a first Port through a series of polarisation modifying optical components;
  utilising a dielectric mirror to filter out a first wavelength range from other wavelength ranges of said transmitted light;
  manipulating the polarisation state of said first wavelength range;
  recombining said manipulated first wavelength with said other wavelength ranges of said transmitted light;
  transmitting said recombined light through a second series of polarisation modifying optical components towards a second Port;
  such that light emitted from said first Port in said other wavelength ranges is directed towards said second Port whereas light emitted from said first Port in said first wavelength range is transmitted away from said second Port.

8. A method as claimed in claim 7 wherein light emitted from said second Port in said other wavelength ranges is directed towards said first Port whereas light emitted from said second Port in said first wavelength range is transmitted away from said first Port.

9. An optical filter for providing frequency dependant filtering of an optical input signal, said filter including:
  at least one input signal waveguide;
  at least one output signal waveguide;
  a series of optical signal manipulation elements including at least one polarisation separation means for separating an optical input signal into polarisation states;
  wherein an optical input signal emitted from said input signal waveguide is spatially separated into said polarisation states and traverses said series of optical signal manipulation elements to be output at said output waveguide and wherein at least one of said optical signal manipulation elements operates on said polarisation states so as to attenuate to a predetermined amount at least a first range of frequencies of said optical input signal relative to adjacent second range of frequencies thereof, and
  wherein said input and output waveguides are spaced apart adjacent one another and said optical manipulation elements include a mirror for reflecting light emitted from said input waveguide and passing through predetermined individual optical manipulation elements towards said output waveguide.

10. A filter as claimed in claim 9 wherein at least one of said optical manipulation elements are traversed twice by said light emitted from said input waveguide.

11. A filter as claimed in claim 9 wherein said polarisation states comprise substantially orthogonal polarisation states.

12. A filter as claimed in claim 9 wherein light emitted from said input waveguide is spatially separated into substantially orthogonal polarisation states by said polarisation separation means prior to being acted on by any other optical manipulation elements.

13. A filter as claimed in claim 12 wherein said polarisation separation means is spaced adjacent said input and output waveguides and further spatially aligns separated polarisation states of said second range of frequencies immediately prior to being emitted out of said output waveguide.

14. A filter as claimed in claim 9 wherein said optical manipulation elements include at least one faraday rotator which applies a non-reciprocal rotation to light emitted from said input waveguide.

15. A filter as claimed in claim 14 wherein said at least one faraday rotator is traversed twice by light passing from said input waveguide to said output waveguide.

16. A filter as claimed in claim 9 wherein said optical manipulation components further include a lens for focussing light emitted from said input waveguide towards said output waveguide.

17. A filter as claimed in claim 9 wherein said optical manipulation components includes at least one dielectric mirror, said mirror substantially transmitting a first predetermined frequency range and substantially reflecting a second predetermined frequency range.

18. A method of filtering an optical input signal in a frequency dependant manner to produce an optical output signal, said method comprising the steps of:
  (a) spatially separating substantially orthogonal polarisation states;
  (b) manipulating the polarisation rotation of at least one first predetermined candidate range of frequencies of the separated polarisation states relative to a second predetermined range of frequencies;
  (c) spatially combining the polarisation states with the degree of spatial combination being frequency dependant; and
  (d) outputting the spatially combined polarisation states as said optical output signal.

19. A method as claimed in claim 18 wherein said step (b) includes projecting the separated polarisation states through a first series of polarisation manipulation elements.

20. A method as claimed in claim 18 wherein said step (b) comprises:
  using an optical filter to substantially separate said candidate range of frequencies from said second predetermined range of frequencies;
  applying a separate polarisation manipulation to said candidate range of frequencies; and
  combining said candidate range of frequencies with said second predetermined range of frequencies.

21. A method as claimed in claim 18 wherein said degree of spatial combination comprises for said second predetermined range of frequencies, spatially combined polarisation states centrally located at an optical output port and, for said at least one first predetermined range of frequencies, separated orthogonal polarisation states spatially located on either side of said optical output port.

22. A method as claimed in claim 21 wherein the amount of spatial separation of said separated orthogonal poloarisation states is externally controllable.

23. An optical communication system including at least one wavelength dependent optical device comprising:
  at least two optical Ports;
  a first series of optical components placed between said two Ports and a first dielectric mirror;
  a first dielectric mirror operating substantially in reflectance mode in at least a first predetermined wavelength range and substantially in transmission mode in at least a second predetermined wavelength range;
  at least one second optical component placed between said first dielectric mirror and a second mirror;
  a second mirror operating substantially in reflectance mode at said second predetermined wavelength range;

wherein
light emitted from a first said Port at said first predetermined wavelength is transmitted to a second said Port, and light emitted from a first said Port at said second predetermined wavelength is transmitted away form said second Port, and wherein light emitted from said second Port at said first predetermined wavelength is transmitted away from said first Port, and light emitted from said second Port at said second predetermined wavelength is transmitted to said first Port.

24. A filter as claimed in claim 9, further comprising a wavelength selective mirror.

25. A filter as claimed in claim 24 wherein said wavelength selective mirror is a variable wavelength selective mirror.

26. An optical filter for providing frequency dependant filtering of an optical input signal, said filter including:

at least one input signal waveguide;

at least one output signal waveguide;

a series of optical signal manipulation elements including at least one polarisation separation means for separating an optical input signal into polarisation states;

wherein an optical input signal emitted from said input signal waveguide is spatially separated into said polarisation states and traverses said series of optical signal manipulation elements to be output at said output waveguide and wherein at least one of said optical signal manipulation elements operates on said polarisation states so as to attenuate to a predetermined amount at least a first range of frequencies of said optical input signal relative to adjacent second range of frequencies thereof, and wherein said optical manipulation components includes at least one dielectric mirror, said mirror substantially transmitting a first predetermined frequency range and substantially reflecting a second predetermined frequency range.

\* \* \* \* \*